US012122155B2

(12) United States Patent
Mochizuki

(10) Patent No.: US 12,122,155 B2
(45) Date of Patent: Oct. 22, 2024

(54) PRINTING APPARATUS AND PRINTING METHOD

(71) Applicant: CANON KABUSHIKI KAISHA, Tokyo (JP)

(72) Inventor: Yugo Mochizuki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 17/862,934

(22) Filed: Jul. 12, 2022

(65) Prior Publication Data

US 2023/0017895 A1 Jan. 19, 2023

(30) Foreign Application Priority Data

Jul. 16, 2021 (JP) ................................ 2021-117911

(51) Int. Cl.
*B41J 2/045* (2006.01)
*B41J 2/21* (2006.01)

(52) U.S. Cl.
CPC ......... *B41J 2/0456* (2013.01); *B41J 2/04586* (2013.01); *B41J 2/2107* (2013.01)

(58) Field of Classification Search
CPC ..... B41J 2/0456; B41J 2/04586; B41J 2/2107
See application file for complete search history.

(56) References Cited

U.S. PATENT DOCUMENTS

2011/0096115 A1* 4/2011 Mizutani ................ B41J 2/2114 347/14
2017/0057245 A1* 3/2017 Morita ................... B41J 2/2114
2021/0354476 A1* 11/2021 Niizuma ................ C09D 11/54

FOREIGN PATENT DOCUMENTS

JP 2016147418 A 8/2016

* cited by examiner

*Primary Examiner* — Sharon Polk
(74) *Attorney, Agent, or Firm* — Canon U.S.A., Inc. I.P. Division

(57) ABSTRACT

A printing apparatus includes an ink application unit, a reactant application unit, a control unit configured to control an application amount of the reactant to be applied by the reactant application unit, and an identification unit configured to identify a pixel included in a line portion based on image data indicating an image to be formed on the print medium. The control unit controls the application amount of the reactant so that an amount per unit area of the reactant to be applied to a region in which the line portion to be formed on the print medium with the pixel identified by the identification unit is to be printed is less than the amount per unit area of the reactant to be applied to a region in which an image including a pixel not identified by the identification unit is formed.

21 Claims, 14 Drawing Sheets

FIG.6C

| | | |
|---|---|---|
| VECTOR DRAWING COMMAND | LINE DRAWING COMMAND | PEN DRAWING INITIALIZATION |
| | | PEN DRAWING RANGE SETTING |
| | | PEN DESIGNATION |
| | | PEN LINEWIDTH SETTING |
| | | PEN COLOR SETTING |
| | | PEN LINK SHAPE SETTING |
| | | MOVING WITHOUT DRAWING |
| | | DRAWING ONE STROKE WHILE MOVING COORDINATES |
| | | PEN RAISING |
| | | PAGE FEED |
| | CHARACTER DRAWING COMMAND | CHARACTER FONT DESIGNATION |
| | | CHARACTER DESIGNATION |
| | HATCHING DRAWING COMMAND | HATCHING TYPE DESIGNATION |
| | | HATCHING DENSITY DESIGNATION |
| BITMAP DRAWING COMMAND | BITMAP DRAWING COMMAND | RASTER DRAWING INITIALIZATION |
| | | COMPRESSION METHOD DESIGNATION |
| | | RASTER DRAWING RANGE SETTING |
| | | RASTER DRAWING DATA DESIGNATION |

PRINTING APPARATUS AND PRINTING METHOD

BACKGROUND OF THE INVENTION

Field of the Invention

The present disclosure relates to a printing apparatus and a printing method.

Description of the Related Art

There is known a printing apparatus that prints an image on a print medium by fixing ink, using a reactant that reacts with the ink.

Japanese Patent Application Laid-Open No. 2016-147418 discusses a technique in which, in order to prevent spreading of a line in a boundary portion between an image and a blank space due to non-application of a reactant to ink in the boundary portion, the application amount of the reactant for the boundary portion is increased.

However, in the method of Japanese Patent Application Laid-Open No. 2016-147418, image quality may be degraded.

When a color material ink and a reactant come into contact with each other, bleeding can occur because of the color material ink flowing into the reactant, before the color material ink fixes by reacting with the reactant. In particular, as illustrated in FIG. 10, when there is a difference between the position of an ink dot (a filled-in circle) of a K (black) color material ink and the position of a reactant dot (a circle not filled in with a solid color) of a reactive ink, the color material ink flows into the reactive ink, so that bleeding of the color material ink increases. If such bleeding occurs in a case where a line portion is printed, a degradation in image quality is easily observed.

SUMMARY OF THE INVENTION

The present disclosure is directed to preventing degradation in the image quality of a line portion.

According to an aspect of the present disclosure, a printing apparatus includes an ink application unit configured to apply an ink including a color material to a print medium, a reactant application unit configured to apply, to the print medium, a reactant for promoting solidification of the ink by reaction with the ink, a control unit configured to control an application amount of the reactant to be applied by the reactant application unit, and an identification unit configured to identify a pixel included in a line portion based on image data indicating an image to be formed on the print medium. The printing apparatus forms the image by applying the ink from the ink application unit in accordance with the image data. The control unit controls the application amount of the reactant so that an amount per unit area of the reactant to be applied to a region in which the line portion to be formed on the print medium with the pixel identified by the identification unit is to be printed is less than the amount per unit area of the reactant to be applied to a region in which an image including a pixel not identified by the identification unit is formed.

Further features of the present disclosure will become apparent from the following description of exemplary embodiments with reference to the attached drawings.

BRIEF DESCRIPTION OF THE DRAWINGS

FIGS. 6A, 6B, and 6C are diagrams illustrating a page-description language (PDL) format and a drawing command in an exemplary embodiment.

FIGS. 9A-1, 9A-2, 9B-1, and 9B-2 are diagrams illustrating an application amount of ink in an exemplary embodiment.

FIGS. 12A, 12B-1, and 12B-2 are diagrams illustrating an image density and a color material dot contact rate in an exemplary embodiment.

DESCRIPTION OF THE EMBODIMENTS

A printing apparatus using an ink jet printing method will be described below as an example. The printing apparatus may be, for example, a single function printer having only a printing function, or may be, for example, a multi-function printer having a plurality of functions, such as a printing function, a facsimile function, and a scanner function. The printing apparatus may be, for example, an apparatus for manufacturing any of a color filter, an electronic device, an optical device, and a microstructure, in a predetermined printing method.

(1) Configuration of Ink Jet Printing Apparatus

Figure 1:
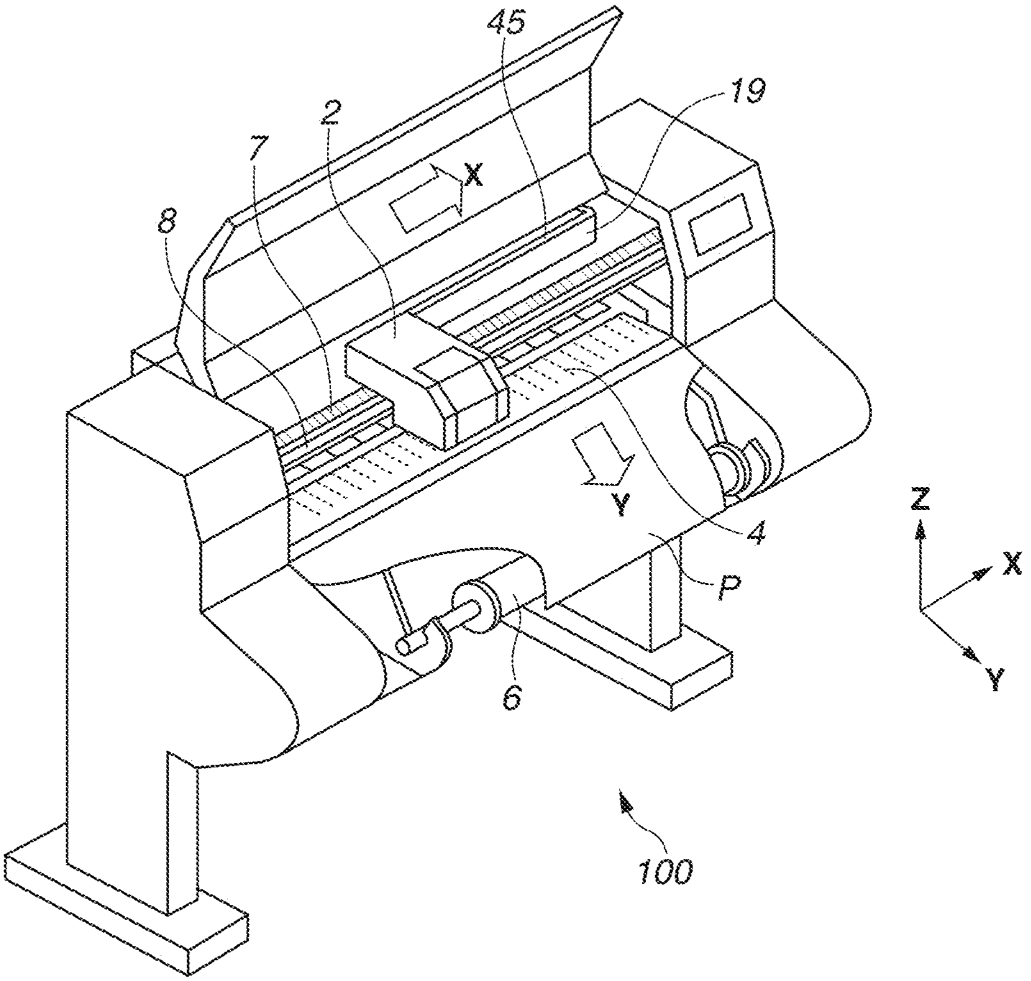
FIG. 1 is a perspective view of a printing apparatus according to an exemplary embodiment.

A first exemplary embodiment of the present disclosure will be described below. FIG. 1 illustrates an outer appearance of an ink jet printing apparatus (hereinafter may also be referred to as a printing apparatus or a printer) 100 according to the present exemplary embodiment. This printing apparatus is of a serial type, and prints an image on a print medium P, by causing a printing head 9 to scan in a scan direction (an X direction) intersecting (in the present exemplary embodiment, orthogonal to) a conveyance direction (a Y direction) of the print medium P.

A configuration of the ink jet printing apparatus 100 and an outline of an operation in printing will be described with reference to FIG. 1. Initially, the print medium P is conveyed from a holding portion 13 (see FIG. 2) holding the print medium P onto a platen 4 which supports the print medium P, by a conveyance roller 14 (see FIG. 2) driven by a conveyance motor (not illustrated) via a gear and a pinch roller 15 (see FIG. 2). On the platen 4, the print medium P is conveyed in the Y direction. When the print medium P is conveyed to a predetermined conveyance position facing a carriage 2, the carriage 2 is driven to perform reciprocal scanning (reciprocal movement) along a guide shaft 8 extending in the X direction, by a carriage motor (not illustrated). The printing head 9 (see FIG. 2) having an ejection port through which ink is ejected is attached to the carriage 2. Ink tubes 19, 45 for supplying ink from ink tanks to the printing head 9. The ink is ejected from the ejection port of the printing head 9 along with the reciprocal movement of the carriage 2, at a timing based on a position signal obtained by an encoder, so that the image is printed on the print medium P. The encoder obtains the position signal by detecting a scale 7 by a sensor (no illustrated) provided on the carriage. A region where the carriage 2 performs scanning and printing in one direction is a region of a bandwidth corresponding to an array range of the ejection ports. The scanning speed is variable, and scanning can be performed at 10 to 70 inches per second. The resolution of printing is also variable, and an ejection operation can be performed at 300 to 2400 dots per inch (dpi). In the present exemplary embodiment, scanning is performed at a scanning speed of 40 inches per second, and an ejection operation is performed at a printing resolution of 1200 dpi (at an interval of 1/1200 inch). When printing for one bandwidth is completed, the print medium P is conveyed in the Y direction by a predetermined amount, and printing for the next bandwidth is performed. When conveyed in the Y direction, the print medium P is wound around a spool 6.

A carriage belt can be used to transmit a driving force from the carriage motor to the carriage 2. In place of the carriage belt, other types of drive system can be used. Examples of those include a system including a lead screw which extends in the X direction and is driven to be rotated by the carriage motor, and an engagement portion which is disposed in the carriage 2 and is engaged in a groove of the lead screw.

Figure 2:
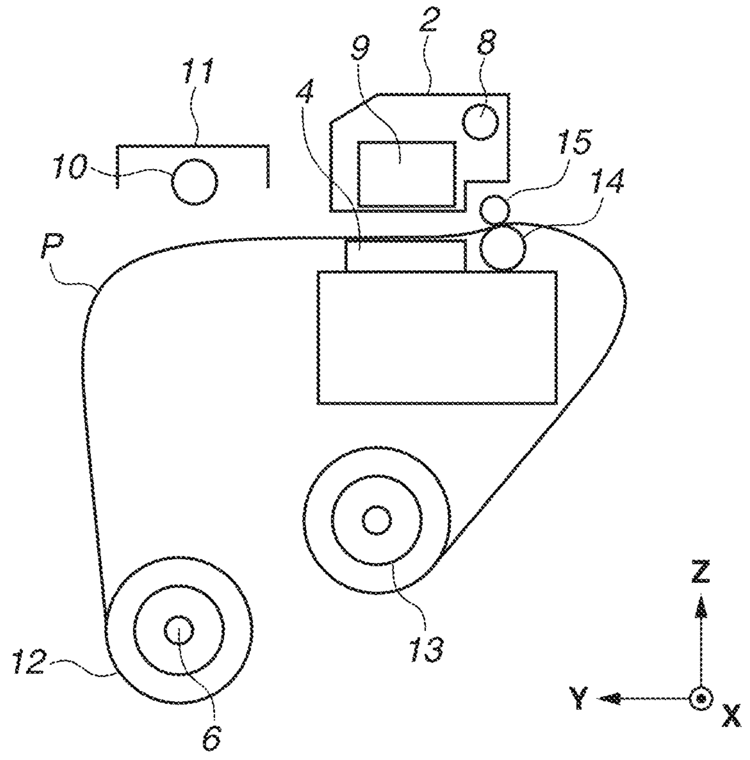
FIG. 2 is a schematic sectional diagram illustrating the printing apparatus according to an exemplary embodiment.

FIG. 2 is a schematic sectional diagram illustrating an internal structure of the printing apparatus 100. Although not illustrated in FIG. 1, the printing apparatus 100 of the present exemplary embodiment has a heating unit including a heater 10 and a heater cover 11. The heater 10 heats and dries the ink applied onto the print medium P for which printing by the printing head 9 is completed. This heating unit also has a function of heating water-soluble resin fine particles to be described below to form a film for coating. The water-soluble resin fine particles are resin which forms a film by being heated after being applied onto a print medium, and is used to improve the abrasion resistance of an image.

The heater 10 supported by a frame (not illustrated) is disposed in a curing region located downstream from the position at which the printing head 9 mounted on the carriage 2 performs reciprocal scanning, in the conveyance direction, and dries the ink in form of liquid on the print medium P by heat. The heater 10 is covered by the heater cover 11, and the heater cover 11 has a function of efficiently applying the heat of the heater 10 onto the print medium P, and a function of protecting the heater 10. After printing by the printing head 9, the print medium P is wound around the spool 6, and forms a roll-shaped wound medium 12. For the heater 10, specifically, a sheathed heater, a halogen heater, or the like can be used.

In the printing method of the present exemplary embodiment, the heating temperature of the heating unit in the above-described curing region is desirably more than or equal to the minimum film forming temperature of the water-soluble resin fine particles. In addition, the heating unit is to vaporize most of a liquid component such as a water-soluble organic solvent in the ink during heating, and thus it is desirable to provide a configuration that can ensure a heating period for supplying energy to be used for the evaporation of most of the liquid component. This is set in consideration of film formation properties and evaporation, as well as productivity and heat resistance of the print medium P.

For the heating means of the heating unit in the curing region, heating by warm wind ventilation from above, heating by a heat-conduction heater of contact type from below a print medium, or the like may be used. Further, the heating means of the heating unit in the curing region is disposed at one location in the present exemplary embodiment, but may be disposed at two or more locations, if there is provided a configuration in which a temperature measured by a radiation thermometer (not illustrated) on the print medium P does not exceed a value set for the heating temperature.

(2) Configuration of Printing Head

Figure 3:
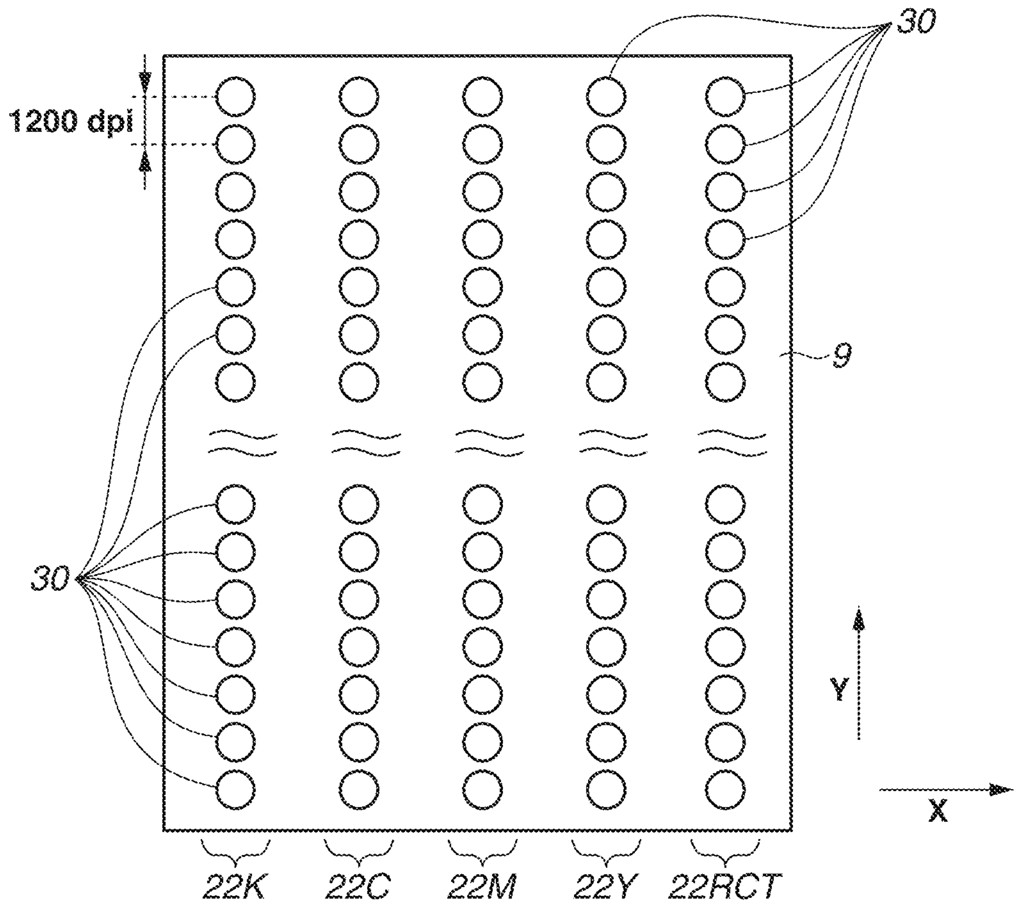
FIG. 3 is a schematic diagram illustrating a printing head viewed from an ejection port side in an exemplary embodiment.

FIG. 3 illustrates an ejection port surface of the printing head 9 according to the present exemplary embodiment. The printing head 9 includes an ejection port array 22K for ejecting black ink (K), an ejection port array 22C for ejecting cyan ink (C), an ejection port array 22M for ejecting magenta ink (M), and an ejection port array 22Y for ejecting yellow ink (Y). The respective inks contain color materials. Since these black ink (K), cyan ink (C), magenta ink (M), and yellow ink (Y) each contain the color material, these may also be referred to as the color material ink in the following description, for simplicity.

The printing head 9 further includes an ejection port array 22RCT for ejecting reactive ink (RCT) containing no color material. This reactive ink contains no color material, but contains a reactive component that reacts with the color material included in the color material ink, and can reduce bleeding by coming into contact with the color material ink on a print medium.

In the printing head 9, the ejection port arrays 22K, 22C, 22M, 22Y, and 22RCT are arranged in this order from the left to the right in the X direction. The ejection port arrays 22K, 22C, 22M, 22Y, and 22RCT are formed by arrangement of 1280 ejection ports 30 for ejecting the corresponding ink in a density of 1200 dpi in the Y direction (an array direction). An amount of ink to be ejected from one of the ejection ports 30 in the present exemplary embodiment at a time is about 4.5 pl.

The ejection port arrays 22K, 22C, 22M, 22Y, and 22RCT are each connected to an ink tank (not illustrated) storing the corresponding ink, and each supplied with the ink. The printing head 9 and the ink tank used in the present exemplary embodiment may be integrally configured, or may be configured in a separatable manner.

The detailed composition of each of the black ink (K), the cyan ink (C), the magenta ink (M), the yellow ink (Y), and the reactive ink (RCT) will be described below.

The water-soluble resin fine particles which forms a film by heat and improves the abrasion resistance of a printed article may be included in the color material of each ink color, or may be included in clear emulsion ink (Em) which is the third ink containing no color material and different from the color material ink and the reactive ink.

In such a case, the printing head 9 may include an ejection port array 22Em for ejecting the clear emulsion ink.

(3) Configuration of Printing System

Figure 4:
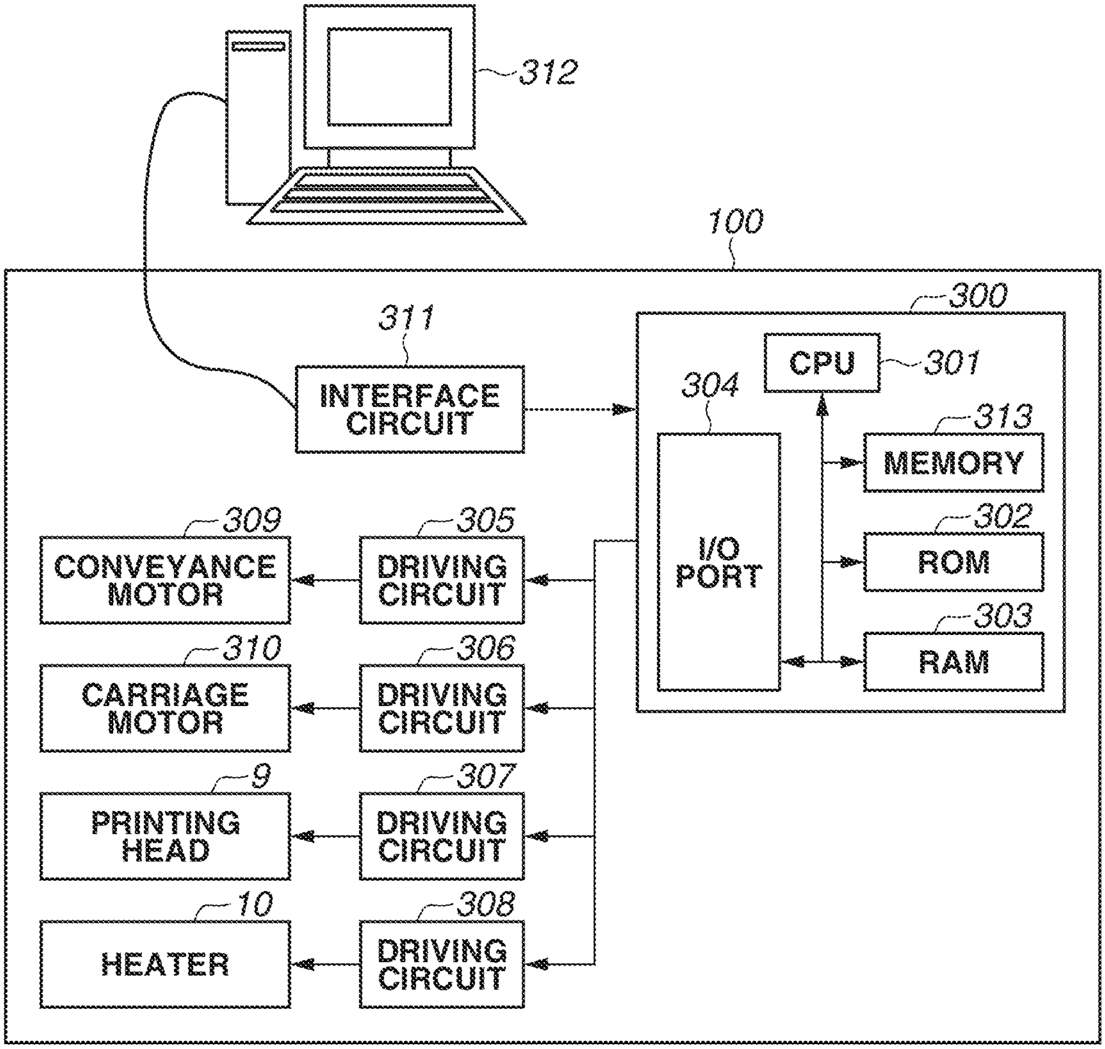
FIG. 4 is a schematic diagram illustrating a printing control system in an exemplary embodiment.

FIG. 4 is a block diagram illustrating a schematic configuration of a control system of the printing apparatus 100 in the present exemplary embodiment. A main control unit 300 includes a central processing unit (CPU) 301, a read only memory (ROM) 302, a random access memory (RAM) 303, and an input/output (I/O) port 304. The CPU 301 executes processing operation and printing operation, including calculation, selection, determination, and control. The ROM 302 stores a control program to be executed by the CPU 301, and the like. The RAM 303 is used as a buffer for print data, and the like. A memory 313 stores a mask pattern to be described below, and the like. Driving circuits 305, 306, 307, and 308, which serve as actuators for a conveyance motor 309 for driving the conveyance roller 14, a carriage motor 310 for scanning of the carriage 2, the printing head 9, and the heater 10, are connected to the I/O port 304. Further, the main control unit 300 is connected to a host computer (a host personal computer (PC)) 312 via an interface circuit 311.

(4) Image Processing

Figure 5:
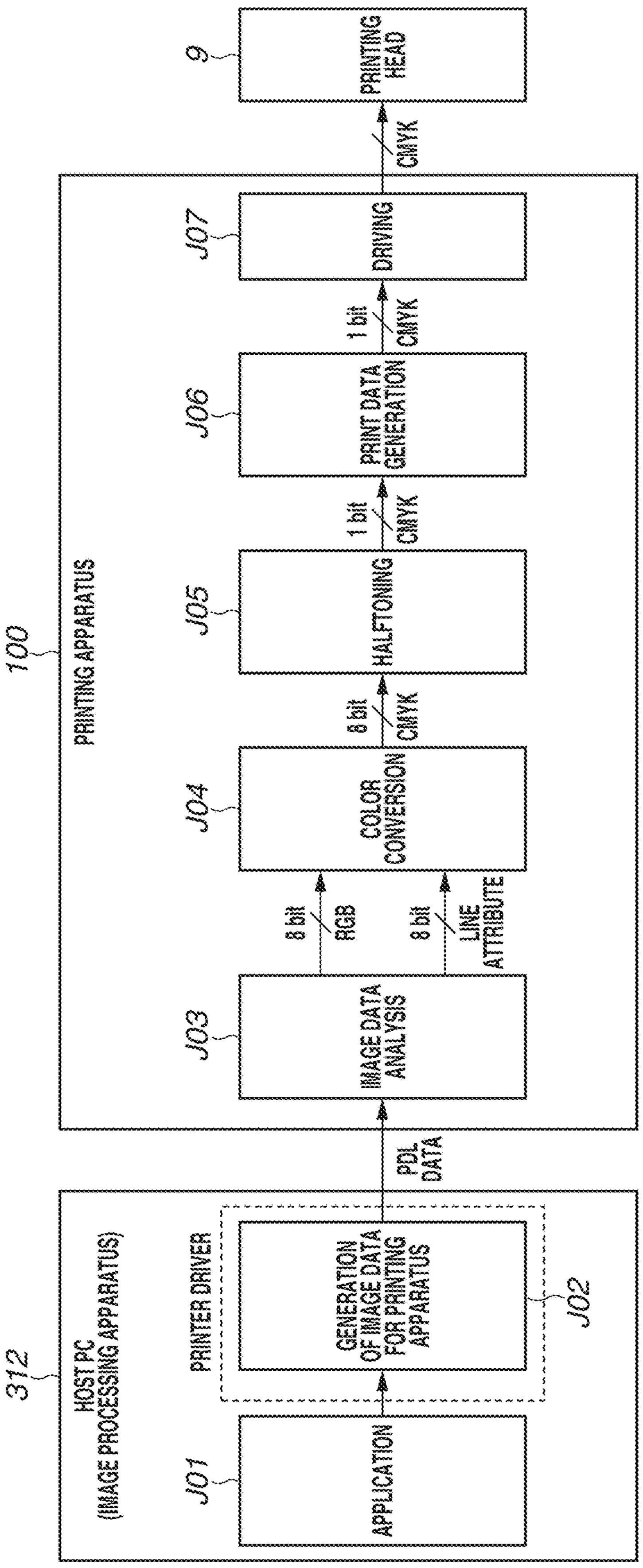
FIG. 5 is a diagram illustrating data processing stages in an exemplary embodiment.

FIG. 5 is a block diagram illustrating a flow of image data conversion processing. Image processing in the printing system of this example is executed by each of the host PC 312 and the printing apparatus 100. Through the image data conversion processing, data indicating an ink dot formation position in each print scan is generated from input print data.

(4-1) Image Processing in Host Computer

Programs that run on an operating system of the host PC 312 include an application and a printer driver. Examples of the application include an application for creating a computer aided design (CAD) drawing. In an application process J01, the application executes processing of generating image data corresponding to an image to be printed by the printing apparatus 100. The image data generated by the application process J01 is passed to the printer driver.

The printer driver of the host PC 312 generates image data in page-description language (PDL) format. The image data in the PDL format will be hereinafter referred to as "PDL data". Known examples of the PDL include "PDF" and "PostScript" produced by Adobe Inc., and "HPGL/2" produced by Hewlett-Packard Company. The PDL is widely used as an image format in which not only a bitmap but also vector data such as a line and a character is describable. The printer driver performs a generation process J02 for generating image data for printing apparatus, from the image data received from the application. The image data for printing apparatus is PDL data, and the printer driver adds a header portion such as printing-related setting information set via a user interface (UI) of the host PC 312 to the received image data, and generates the image data for printing apparatus. The generated image data for printing apparatus is transmitted to and received by the printing apparatus 100 via the interface circuit 311 of the printing apparatus 100, and then stored in the RAM 303 used as a data buffer.

Figure 6A:
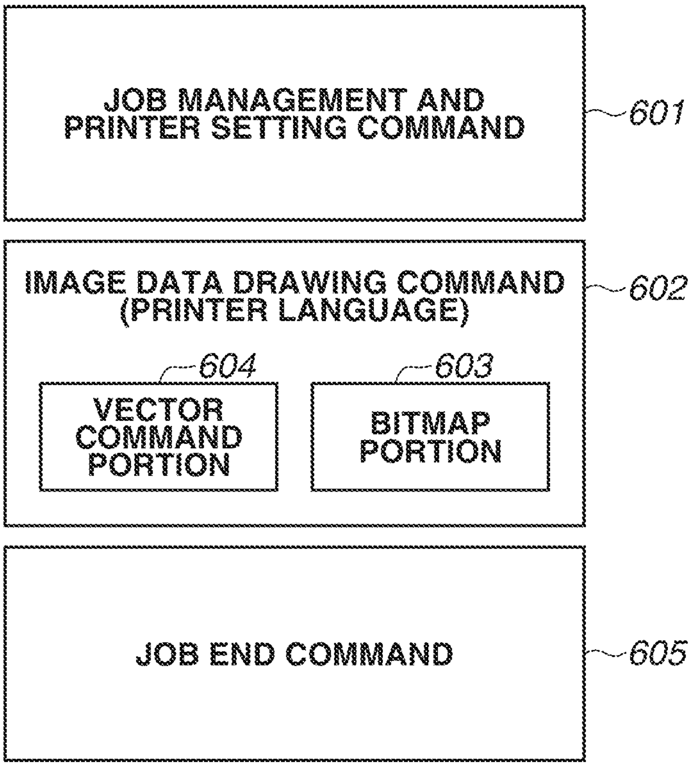
Figure 6B:
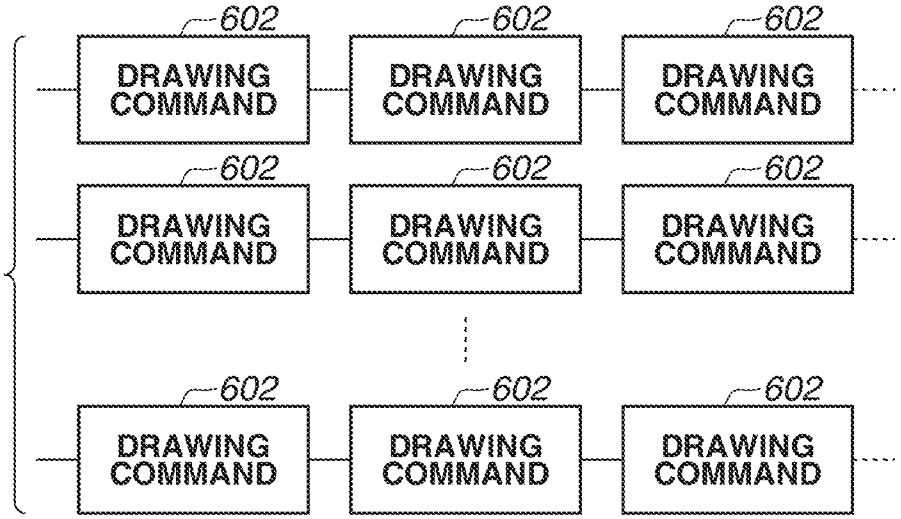

FIG. 6A illustrates an example of the PDL format. The PDL format includes a job management and printer setting command 601, an image data drawing command 602, and a job end command 605. The image data drawing command 602 includes a bitmap portion 603 and a vector command portion 604, and is in a format that can express not only a bitmap but also figures, such as a character and a line. FIG. 6B illustrates the image data drawing command 602. The image data drawing command 602 has a configuration in which a plurality of series of drawing commands 602 (referred to as a display list (DL)) per certain unit (here 64 [KB]) is combined.

FIG. 6C illustrates a command table for illustrating a breakdown of the drawing commands 602. The drawing commands 602 are classified roughly into bitmap drawing commands and vector drawing commands. Further, the vector drawing commands are classified roughly into "line drawing commands" about the color, linewidth, and drawing of a pen, "character drawing commands" specifying a character font and a character itself, and "hatching drawing commands" specifying a hatching type and a hatching density. The image data in such a PDL format is transmitted from the host PC 312 to the printing apparatus 100.

(4-2) Processing in Printing Apparatus

An image data analysis process J03 and subsequent processes illustrated in FIG. 5 will be described. The CPU 301 reads a computer-executable program stored in the ROM 302 serving as a storage region into the RAM 303 serving as a work memory, and executes the read program, thus performing the series of processes illustrated here. After the host computer 312 transmits a print command including image data in the PDL format, at first, a series of print command data is received via the interface circuit 311 and the I/O port 304, and stored in the RAM 303 serving as the work memory. The print command data includes, in addition to the image data, the size of the image data and a printing mode for printing the image data, and image processing to be described below is executed based on a result of analyzing these pieces of information.

The CPU 301 performs the image data analysis process J03 illustrated in FIG. 5. In the image data analysis process J03, the image data in the PDL format is sequentially read out from the RAM 303 serving as the work memory. The CPU 301 interprets the drawing command included in the PDL data, and develops the image data (PDL data) in the PDL format into raster image data in a form similar to bitmap. The raster image data is stored into the RAM 303 serving as the work memory. In the present exemplary embodiment, the raster image data is multi-valued data of R (red), G (green), and B (blue).

Next, the CPU 301 performs a color conversion process J04. The color conversion process J04 is a process of converting print data into image data including color signals of ink in the printing apparatus 100. For example, in a case where image data indicating an image is included in the input print data, and the image data indicates an image in coordinates of a color space such as sRGB expressing colors for a monitor, the color coordinates (R, G, B) of this sRGB is converted into ink color data (C, M, Y, K) of the printing apparatus 100. A conversion method therefor is implemented by a known technique, such as processing using matrix arithmetic processing and a three-dimensional look-up table (LUT). The printing apparatus 100 in this example uses the ink of black (K), cyan (C), magenta (M), and yellow (Y), so that the image data with RGB signals is converted into image data formed by 8-bit color signals of K, C, M, and Y. The color signal of each ink corresponds to an application amount of each ink. The number of colors of ink is not limited to four of K, C, M, and Y. In a case where inks except for KCMY inks, such as ink of light cyan (Lc) lower in density than cyan (C), ink of light magenta (Lm) lower in density than magenta (M), and ink of gray (Gy) are used, color signals corresponding to these inks are generated.

Next, the CPU 301 performs a halftoning process J05 illustrated in FIG. 5. The halftoning process J05 is performed for the image data including the color signals having been subjected to the color conversion process J04. This halftoning process J05 is a process for reducing the number of levels of tone of image data. In this example, the halftoning process J05 is performed using a dither matrix in which thresholds for comparison with the values of image data are arranged for the respective pixels. Binary data indicating whether to form an ink dot in each pixel is eventually generated through the halftoning process J05. In a case where a multipass printing method to be described below is adopted, by performing mask processing of thinning out ink for printing in one scan using a mask pattern or the like for data after the halftoning process, processing of determining a pixel for injection in each scan is performed.

Next, the CPU 301 performs a print data generation process J06 illustrated in FIG. 5. Print data in which printing control information is added to printing image data containing 1-bit dot data is generated through the print data generation process J06. The generated print data is stored into the RAM 303 serving as the work memory. The binary print data stored in the RAM 303 serving as the work memory is sequentially read out by the CPU 301, and is input into the head driving circuit 307, and a driving process J07 is performed. The 1-bit print data of each ink color which has been input into the head driving circuit 307 is converted into a driving pulse of the printing head 9, and the printing head 9 is driven by the head driving circuit 307 to eject the ink at a predetermined timing based on the driving pulse.

The look-up table referred to in the color conversion process and the dither matrix referred to in the halftone process described above are each prepared beforehand in a plurality of sets in the ROM 302 serving as the storage region, depending on the type of the print medium and the printing mode. In response to receiving print command data, the main control unit 300 analyzes the received print command data, selectively reads out the look-up table corresponding to the print command from the ROM 302 serving as the storage region, loads the read-out look-up table into the RAM 303 serving as the work memory, and uses this look-up table.

In the present exemplary embodiment, the processes J01 and J02 are performed in the host computer 312, and the process J03 and subsequent processes are performed in the printing apparatus 100. However, the process J01 to the process J06 may be performed in the host computer 312.

(5) Multipass Printing Method

In the present exemplary embodiment, an image is printed by multipass printing in which printing is performed with multiple scans for a predetermined region on a print medium, using each ink of K, C, M, Y, and RCT. General multipass printing will be described below.

Figure 7:
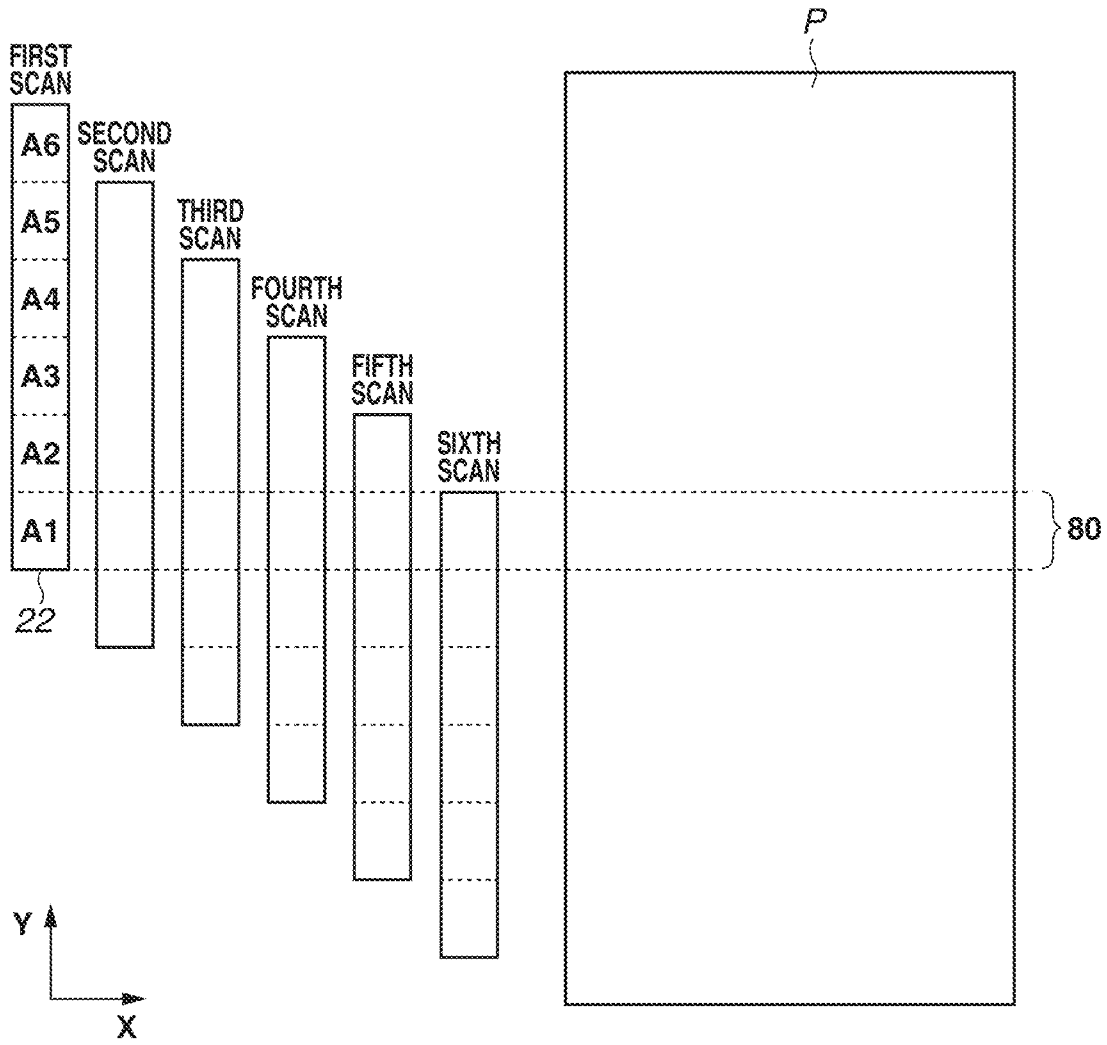
FIG. 7 is a diagram illustrating multipass printing in an exemplary embodiment.

FIG. 7 is a diagram illustrating a general multipass printing method. Here, an image is formed by ejecting ink to a predetermined region, from each of six ejection port groups A1 to A6 formed by the respective ejection port arrays 22 being divided in the Y direction. In other words, the predetermined region is scanned six times. In practical, in response to completion of one scan of the printing head 9, the print medium P is conveyed downstream in the Y direction and the next scan is performed. However, for simplicity, the printing head 9 is illustrated as if the printing head 9 is moved upstream in the Y direction between scans in FIG. 7.

Initially, in the first scan, the printing head 9 is driven to perform scanning in the positional relationship in which a predetermined region 80 on the print medium P and the ejection port group A1 in the ejection port array 22 face each other. During the first scan, the ink is ejected from the ejection port group A1 to the predetermined region 80 based on print data corresponding to the ink of each type corresponding to the first scan. In response to completion of the first scan, the print medium P is conveyed in the Y direction by a distance corresponding to one ejection port group. Subsequently, the second scan is performed, and the ink is ejected from the ejection port group A2 to the predetermined region 80. Afterward, the conveyance of the print medium P and the ejection from the printing head 9 are alternately performed, so that the ejection of the ink from the ejection port groups A3 to A6 to the predetermined region 80 in the third to sixth scans is executed. The multipass printing for the predetermined region 80 is thus completed.

(6) Ink Composition

The details of each ink of the ink set used in the present exemplary embodiment will be described. In the following, "part" and "%" indicate a mass reference, unless otherwise specified.

(6-1) Composition of Each Ink

The composition of each ink will be described in detail below. The color material ink (C, M, Y, K) and the reactive ink (RCT) used in the present exemplary embodiment each contain a water-soluble organic solvent. It is desirable that the water-soluble organic solvent have a boiling point of 150° C. or more and 300° C. or less, in terms of the wettability and the moisture retaining property of the face surface of the printing head 9. A heterocyclic compound with a lactam structure is particularly desirable in terms of a function of a film forming auxiliary for fine resin particles and swelling/solubility properties for the recording medium on which the resin layer is formed. The heterocyclic compound is represented by: ketone compounds, such as acetone and cyclohexanone; a propylene glycol derivative such as tetraethylene glycol dimethyl ether, N-methyl-pyrrolidone, and 2-pyrrolidone.

From the viewpoint of the ejection performance, the content of the water-soluble organic solvent is desirably 3 wt % or more and 30 wt % or less. Specific examples of the water-soluble organic solvent include: alkyl alcohols having 1 to 4 carbon atoms, such as methyl alcohol, ethyl alcohol, n-propyl alcohol, isopropyl alcohol, n-butyl alcohol, sec-butyl alcohol, and tert-butyl alcohol; amides, such as dimethylformamide and dimethylacetamide; ketones or ketoalcohols, such as acetone and diacetone alcohol; ethers, such as tetrahydrofuran and dioxane; polyalkylene glycols, such as polyethylene glycol and polypropylene glycol; ethylene glycol, or alkylene glycols whose alkylene groups have 2 to 6 carbon atoms, such as propylene glycol, butylene glycol, triethylene glycol, 1,2,6-hexantriol, thiodiglycol, hexylene glycol, and diethylene glycol; lower alkyl ether acetates, such as polyethylene glycol monomethyl ether acetate; glycerol; lower alkyl ethers of polyhydric alcohols, such as ethylene glycol monomethyl (or ethyl) ether, diethylene glycol methyl (or ethyl) ether, and triethylene glycol monomethyl (or ethyl) ether; polyhydric alcohols, such as trimethylolpropane and trimethylolethane; and N-methyl-2-pyrrolidone, 2-pyrrolidone, and 1,3-dimethyl-2-imidazolidinone. The water-soluble organic solvents described above can be used alone or as a mixture.

It is desirable to use deionized water, as the water. The content of the water-soluble organic solvent of the reactive ink (RCT) is not limited in particular. However, in addition to the above-described components, a surfactant, an anti-foaming agent, a preservative, a mildewproofing agent, and the like can be appropriately added to the color material ink (C, M, Y, K), in order to provide a desired physical property as needed.

The color material ink (C, M, Y, K) and the reactive ink (RCT) used in the present exemplary embodiment each contain a surfactant. The surfactant is used as a penetrant for improving the permeability of ink for a print medium dedicated to ink jet printing. As the amount of the added surfactant is larger, the property to reduce the surface tension of ink is stronger, so that the wettability and the permeability of the ink for the print medium improve. In the present exemplary embodiment, a small amount of an acetylene glycol EO adduct or the like is added as the surfactant, and an adjustment is made so that the surface tension of each ink is 30 dyn/cm or less, and the difference in surface tension between the inks is 2 dyn/cm or less. To be more specific, the surface tensions of the respective inks are all adjusted to be about 22 to 24 dyn/cm. The surface tension is measured using a fully-automatic surface tensiometer CBVP-Z (manufactured by Kyowa Interface Science Co., Ltd.). The measurement device is not limited to one in this example as long as the surface tension of the ink can be measured.

The pH of each ink of the present exemplary embodiment is stable on the alkali side, and the value thereof is 8.5 to 9.5. In terms of preventing dissolution and degradation of a member in contact with each ink in the printing apparatus and the printing head, a decline in solubility of a dispersion resin in the ink, and the like, the pH of each ink is desirably 7.0 or more and 10.0 or less. The pH is measured using a pH meter F-52 manufactured by HORIBA, Ltd. The measurement device is not limited to this example as long as the pH of each ink can be measured.

(6-2) Reactive Ink

In the present exemplary embodiment, a system of printing using a reactant for insolubilizing a part or all of the solid component of the color material ink is adopted to address image-related issues such as bleeding and beading.

The reactant is intended to insolubilize dissolved dye as well as dispersed colorant and resin. Thus, examples of the reactant include a solution including polyvalent metal ions (examples of such a solution include magnesium nitrate, magnesium chloride, aluminum sulfate, and iron chloride). As one type of such aggregation using cation, it is possible to use a type used in a low-molecular-weight cationic polymer aggregating agent for the purpose of electric charge neutralization of water-soluble resin fine particles and insolubilization of an anionic soluble substance.

In addition, as another reacting system, there is a system achieving insolubilization by a reactant utilizing a difference in pH.

As described above, in general, most of color material inks used in ink jet printing are stable on the alkaline side due to properties such as the properties of the color materials. The pH is generally about 7 to 10, and there are many examples in which the pH is mainly set to about 8.5 to 9.5, from the industrial standpoint, and in consideration of the influence of an external environmental, and the like. To aggregate and solidify the color material ink of such a type, the stable state is destroyed by mixing an acid solution and varying the pH, so that the dispersed component can be aggregated. For the purpose of such an action, a solution with acidity can also be used as the reactant.

(6-3) Water-Soluble Resin Fine Particles

The color material ink of the present exemplary embodiment contains the water-soluble resin fine particles for improving the abrasion resistance (fixability) of a printed image by bringing the print medium and the color material into tight contact with each other. The resin fine particles are melt by heat, and a film of the resin fine particles is formed and the solvent contained in the ink is dried by a heater. In the present exemplary embodiment, "resin fine particles" are polymer fine particles in a state of being dispersed in water.

Specific examples of the resin fine particles include: fine acrylic resin particles synthesized by emulsion polymerization of a monomer, such as alkyl (meth) acrylate and (meth) acrylic acid alkylamide; fine styrene-acrylic resin particles synthesized by emulsion polymerization of alkyl (meth) acrylate or (meth) acrylic acid alkylamide with a styrene monomer; and fine polyethylene resin particles, fine polypropylene resin particles, fine polyurethane resin particles, and fine styrene-butadiene resin particles. The examples further include fine core-shell resin particles each including a core and a shell made of polymers having different compositions, and fine resin particles produced by emulsion polymerization using fine acrylic particles synthesized in advance as seeds for controlling the particle size. The examples further include fine hybrid resin particles produced by chemically bonding different types of fine resin particles, for example, fine acrylic resin particles and fine urethane resin particles.

The water-soluble resin fine particles are not necessarily included in the color material, and may be included in the clear emulsion ink (Em) which is the third ink containing no color material and different from the color material ink and the reactive ink.

(7) Print Medium

The printing apparatus in the present exemplary embodiment can perform printing on a low-permeability print medium through which water is not easily permeated. The low-permeability print medium here indicates a medium which absorbs no water or absorbs an extremely small amount of water. Thus, it is difficult to form an image using ink not including an organic solvent, because the ink is repelled. In contrast, the low-permeability print medium is superior in terms of water resistance and weatherability, and thus is suitable as a medium for forming a printed article for outdoor use. A print medium having a water contact angle of 45 degrees or higher, more desirably, 60 degrees or higher, at 25° C. is often used as the medium for forming the printed article for outdoor use.

The low-permeability print medium is a print medium in which a plastic layer is formed on the outermost surface of a substrate, a print medium in which no ink receiving layer is formed on a substrate, a sheet, film, or banner of glass, YUPO (registered trademark), or plastic, or the like. Examples of the above-described plastic for coating include polyvinyl chloride, polyethylene terephthalate, polycarbonate, polystyrene, polyurethane, polyethylene, and polypropylene. These low-permeability print mediums are superior in terms of water resistance, light resistance, and abrasion resistance, and thus is generally used in printing of an object for outdoor display.

The Bristow method described in Standard No. 51 "Paper and Paperboard—Liquid Absorption Test Method—Bristow Method" in JAPAN TAPPI PAPER AND PULP TEST METHODS can be used as an example of a method of evaluating the permeability of the print medium. In the Bristow method, a predetermined amount of ink is injected into a storage container having an opening slit of a predetermined size. Via the slit, the ink is brought into contact with a print medium that has been processed to have a strip shape and then wound around a disk. The disk is rotated while the position of the storage container is fixed, and the area (length) of an ink strip transferred thereby to the print medium is measured. A transfer amount per second for each unit area (ml·m−2) can be calculated based on the area of this ink strip. In the present exemplary embodiment, a print medium in which a transfer amount (an amount of absorbed water) of ink in 30 msec1/2 by the above-described Bristow method is less than 10 ml·m−2 is regarded as the low-permeability print medium.

(8) Controlling of Bleeding

Figure 8A:
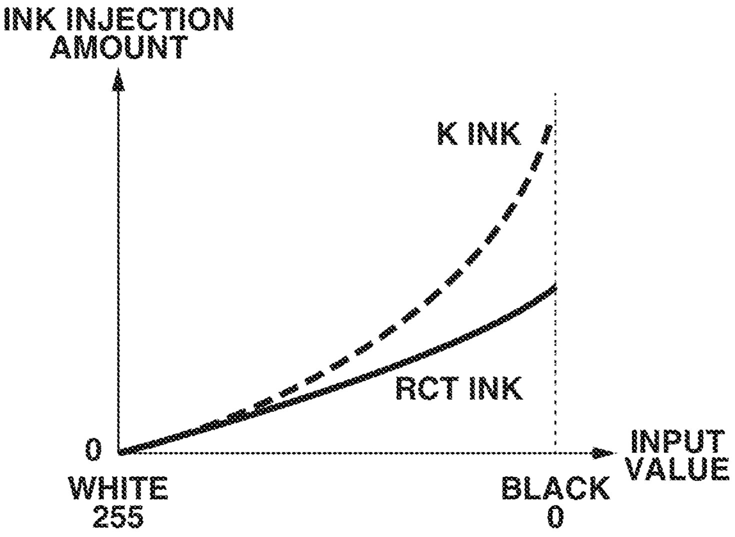
FIGS. 8A and 8B are diagrams illustrating a color conversion process in an exemplary embodiment.

The color conversion process in the present exemplary embodiment will be described with reference to FIG. 8A. FIG. 8A is a diagram illustrating a look-up table which is used in the color conversion process J04 illustrated in FIG. 5. The horizontal axis indicates an input signal value in the color conversion process J04, and indicates here an achromatic tone (R=G=B) from white (R=G=B=255) to black (R=G=B=0). The vertical axis indicates an output signal value in the color conversion process J04. The larger the K-ink application amount is, the higher the density of the input image is. As the K-ink application amount becomes larger, the reactive ink (RCT) application amount is increased, which accelerates an increase in the viscosity of the ink liquid to fix the K ink on a print medium, so that bleeding is controlled.

Figure 10:
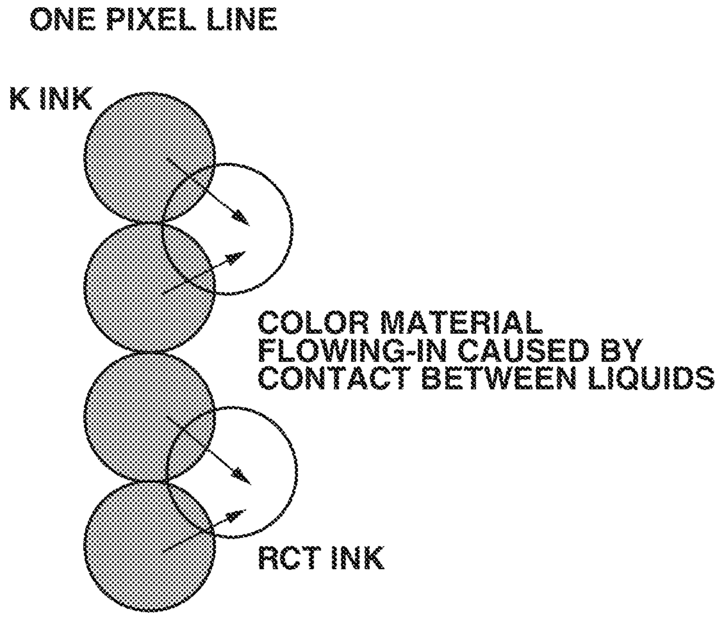
FIG. 10 is a diagram illustrating degradation in line quality caused by ink bleeding in an exemplary embodiment.

In contrast, in a case where a line is printed, a large amount of reactant is applied when the color conversion process in FIG. 8A is performed, because the line generally has a high density. If there is a difference in landing position between the color material ink and the reactive ink as illustrated in FIG. 10, flowing (bleeding) of the ink occurs in a minute region due to contact between a color material ink dot and a reactant dot. As the line is narrower, this minute bleeding becomes more visually noticeable, which reduces the line quality.

Figure 8B:
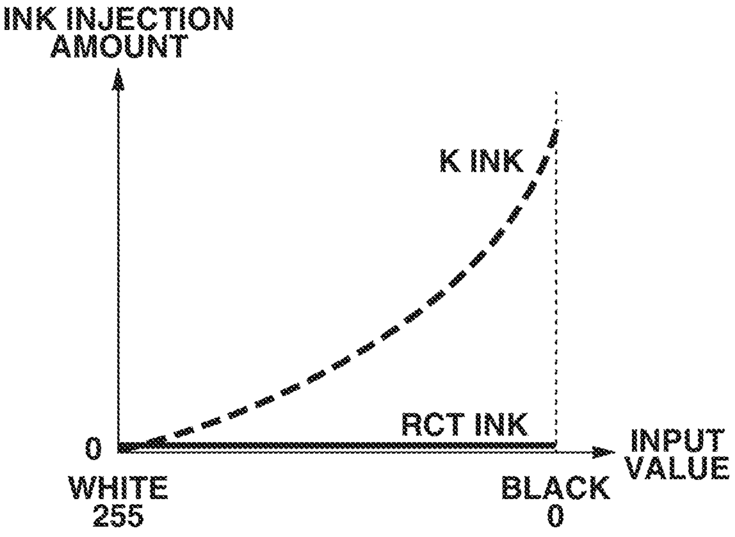

Thus, in the present exemplary embodiment, the color conversion process by which the reactive ink is prevented from being applied to the line is performed as illustrated in FIG. 8B, so that the generation of minute bleeding caused by the contact between the color material ink and the reactive ink described above is controlled.

In the following, a method of forming a high-definition line drawing by controlling bleeding of the line will be described more specifically.

(Detection of Line Portion)

Initially, a method of detecting a line will be described.

In rendering vector data into RGB data in the image data analysis process J03 illustrated in FIG. 5, the CPU 301 acquires a line attribute from the vector data, and generates a line attribute plane (α channel) indicating whether the data is a line, pixel by pixel. More specifically, the CPU 301 identifies a line pixel by determining that a pixel corresponding to coordinates to which "drawing one stroke while moving coordinates" in the section of the line drawing command in the PDL illustrated in FIG. 6C is applied is the line pixel.

(Processing for Line Portion)

Next, control for a line portion will be described.

The color conversion process J04 illustrated in FIG. 5 will be described in detail. In the color conversion process J04 of the present exemplary embodiment, color separation LUT switching control is further performed. Here, control for switching to a look-up table to be used in the color conversion process J04 pixel by pixel is performed based on a result of the line determination made through the image data analysis process J03.

In a case where the target pixel is a line pixel, a color separation LUT switching control unit reads out a look-up table for line pixel among a plurality of look-up tables stored beforehand in the ROM 302 serving as the storage region, and provides the read-out look-up table to the color conversion process J04. On the other hand, in a case where the target pixel is not a line pixel, the color separation LUT switching control unit reads out a look-up table for non-line pixel among the plurality of look-up tables stored beforehand in the ROM 302 serving as the storage region, and provides the read-out look-up table to the color conversion process J04. The color conversion process J04 converts the received RGB signals into CMYK signals according to the provided look-up table.

In the present exemplary embodiment, the processing is performed using each of the example illustrated in FIG. 8A as the look-up table for non-line pixel (for normal pixel), and the example illustrated in FIG. 8B as the look-up table for line pixel.

In either example, the horizontal axis indicates an input signal value in the color conversion process J04, and indicates an achromatic tone (R=G=B) from white (R=G=B=255) to black (R=G=B=0). On the other hand, the vertical axis indicates an output signal value in the color conversion process J04.

In a case where the target pixel is not a line pixel, image data for applying the reactant is generated in the color conversion process based on the look-up table illustrated in FIG. 8A. The reactant is thereby sufficiently applied to a non-line object. The ink is applied to an adjacent position of the non-line object, and thus, many bleeds are generated if the reactant is not applied. Thus, for the non-line object, the viscosity of the color material ink is quickly increased by applying the reactant, so that bleeding is controlled. The print medium passes through the heater 10 in the state where the viscosity of the color material is increased, so that the ink is fixed at the position of the ink at this moment, and the formation of the image is completed in the state where bleeding is controlled.

In contrast, in a case where the target pixel is a line pixel, image data for not applying the reactant is generated in the color conversion process, based on the look-up table for line pixel illustrated in FIG. 8B. Thus, the amount of the reactant to be applied to a region for printing a line portion including the target pixel becomes zero, so that bleeding due to the application of the reactant does not occur and thus a high-quality thin line can be formed, even if the positions of the ink and the reactant on the print medium are shifted.

Figures 1, 9A:
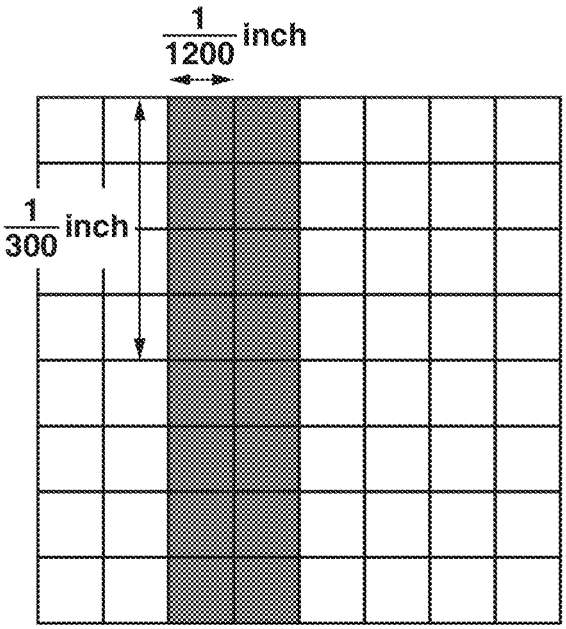
Figures 1, 9B:
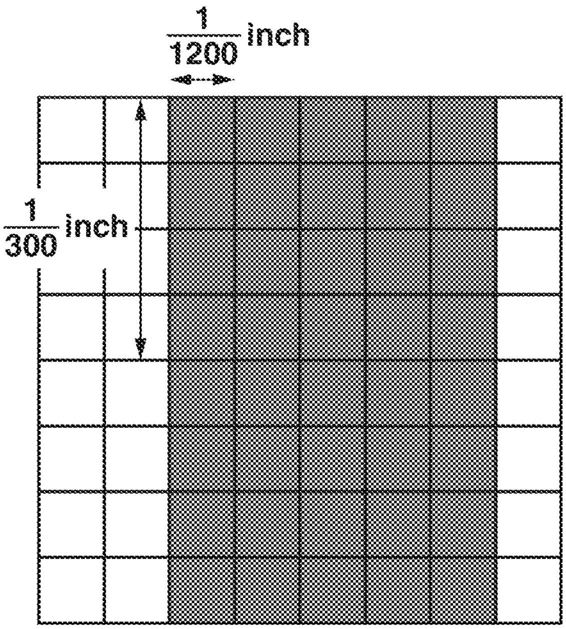
Figures 2, 9A:
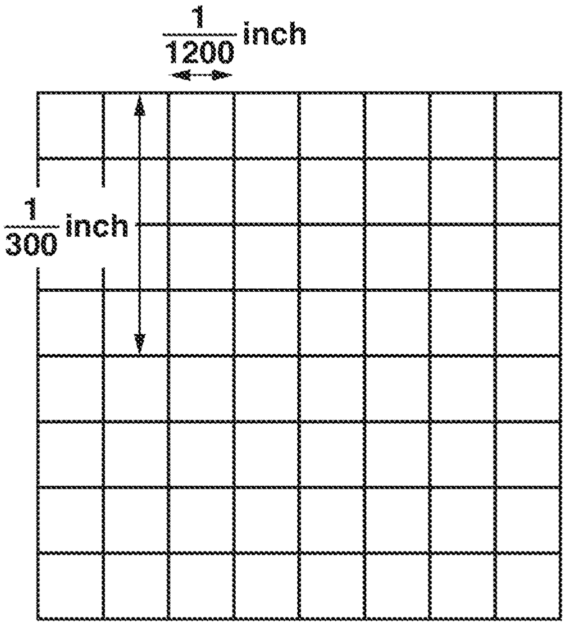
Figures 2, 9B:
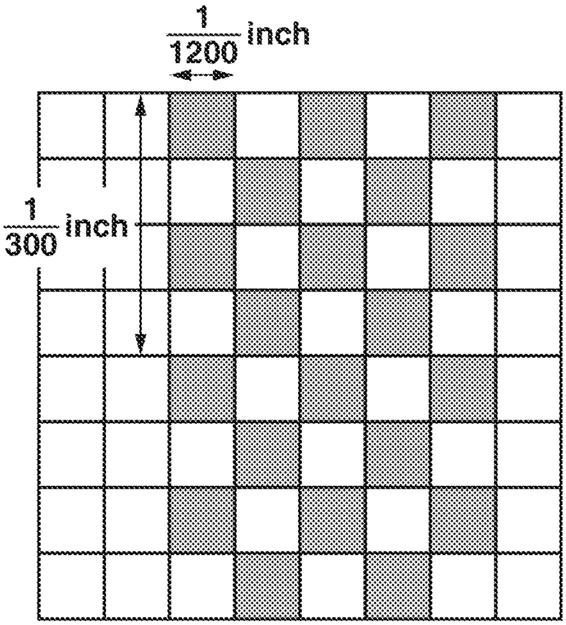

FIGS. 9A-1, 9A-2, 9B-2, and 9B-2 illustrate an application amount of the reactant when each of a line image and a non-line image is printed. FIG. 9A-1 illustrates a line image to be printed using the K ink, and FIG. 9A-2 illustrates the reactant to be applied in this printing. FIG. 9B-1 illustrates a non-line image to be printed using the K ink, and FIG. 9B-2 illustrates the reactant to be applied in this printing. For the line image, the image data for not applying the reactant is generated using the look-up table in FIG. 8B, and thus the reactant is not applied as illustrated in FIG. 9A-2.

In contrast, in the case of the non-line image, the image data is generated using the look-up table illustrated in FIG. 8A, and thus the reactant is applied to the pixels of 50% of the region for which the K ink is to be applied as illustrated in FIG. 9B-2. When an area of 5 pixels in the vertical (1/300 inches)×1 pixel in the horizontal (1/1200 inches) is a unit area, the K ink having a density of 100% is applied within the unit area for each of the line image and the non-line image illustrated in FIGS. 9A-1 to 9B-2. The amount of the reactant applied to this unit area in the line image is less than in the non-line image.

As described above, the amount of the reactant is appropriately controlled for each region depending on the type of an image. It is therefore possible to control a decline in image quality, by controlling bleeding of a thin line, while fixing the color material ink to a print medium, even if the print medium is a low-permeability print medium.

The form in which the data is generated so as not to apply the reactant for the pixel of the line portion has been described. However, an effect of controlling bleeding can be obtained, if the amount of the reactant to be applied per unit area for the line portion is less than the amount of the reactant to be applied per unit area for the non-line portion.

(Processing Depending on Linewidth)

Incidentally, in a case where the reactant is not applied to a thick line (an object with a large area), a large amount of the ink is present in a wide range as with as a non-line object, even if the thick line is a line portion. Thus, if the reactant is not applied because the thick line is a line portion, the ink in, in particular, a central part of the thick line is not successfully fixed to the print medium, so that the ink may flow when the print medium is tilted. In contrast, in a case where the reactant is applied to the thick line, minute bleeding occurs as a phenomenon because of the contact between the color material ink and the reactive ink, in an edge part at the boundary between the line portion and a region which is not a line. However, the minute bleeding is related to the thick line, and thus is less likely to be visually noticed. Therefore, it is desirable to control the application of the reactant so as not to apply the reactant to a thin line having a certain width or less, and to appropriately apply the reactant to a thick line having a certain width or more in a manner similar to the case of the non-line pixel.

Whether the line is a thin line or a thick line can be determined based on, specifically, linewidth information obtained from "pen linewidth setting" of the line drawing command in the PDL. If the linewidth of the drawing command is a predetermined width or less, the line is determined to be a thin line, and if the linewidth of the drawing command is a predetermined width or more, the line is determined to be a thick line. The control is performed so that the look-up table for line drawing in FIG. 8B is applied in the color conversion process if the target pixel is a thin line, and the look-up table for non-line drawing (for normal pixel) in FIG. 8A is applied in the color conversion process if the target pixel is a thick line or not a line.

The processing in which the reactant application amount for the thin line is zero has been described above. However, the reactant application amount may not be zero, and may be controlled to be gradually decreased as the line becomes thinner, using the linewidth information. When a line is drawn while the linewidth thereof is changed from thin to thick, if the reactant is suddenly applied in large amount at the time when the linewidth becomes a certain width or more, bleeding can suddenly occur and be noticeable. Thus, the reactant application amount is gradually changed depending on the linewidth, so that the boundary between a part with bleeding and a part without bleeding is less noticeable, and occurrence of bleeding of a thin line can be suppressed.

For example, it is possible to perform signal value conversion for generating the image data such that the image data is closer to an image data applying the look-up table for line drawing in FIG. 8B as the linewidth is smaller, and closer to an image data applying the image data to be generated becomes closer to the look-up table for non-line drawing in FIG. 8A as the linewidth is larger. For example, the look-up table for non-line drawing in FIG. 8A is applied to a thick line having a predetermined linewidth or more, and the look-up table for line drawing in FIG. 8B is applied to a thin line having a predetermined linewidth or less. For a linewidth therebetween, the color conversion process may be performed based on a signal value obtained through processing of performing linear interpolation between the look-up table for non-line drawing in FIG. 8A and the look-up table for line drawing in FIG. 8B.

Depending on the print medium, the interfacial tension and wettability with respect to an ink drop varies, and the wet spreading manner and the spreading speed of a droplet also vary. Changing of a thin line determination threshold (the above-described predetermined width) for each print medium or each printing speed enables optimum reactant application control for individual print medium.

(Case of Color Line)

The case of a single color line of the K ink has been described so far, but similar control is also effective for a color line using ink of other colors, such as the C ink, the M ink, and the Y ink. Further, for example, for a line generated using a secondary color made by the M ink and the Y ink, such as a red line, the reactant amount is controlled to be reduced, so that bleeding can be controlled and the line quality of the color line can be improved.

(Case of Raster Data)

In the present exemplary embodiment, the case where the input data is the vector data for the CAD drawing or the like has been described, but the input data may be raster data, such as a photograph image and a poster image. A method of detecting a line and a linewidth in such a case will be described.

In the case of the raster data (such as an RGB image), an edge amount and directivity are extracted in a filtering process, and the likelihood of a line can be estimated based thereon. More specifically, a typical edge extraction filter and a pattern matching technique for determining directivity may be used.

However, it is desirable to set a filter size suitable for a linewidth to be detected. If an excessively wide filter size is set, a large-width object that is not to be determined to be a thin line can be erroneously determined to be a thin line. For example, in a case where a line in a range of a 1-pixel line or more to a five-pixel line or less is to be detected, it is appropriate to set a group of 7×7 pixels around a target pixel to the filter size. By thus setting the filter size, the target pixel is determined to be a thin line when the likelihood of the target pixel being a thin line is a predetermined value or more.

Depending on the print medium, the interfacial tension and wettability with respect to an ink drop varies, and the wet spreading manner and the spreading speed of a droplet also vary. The thin-line determination filter size may be changed for each print medium or each printing speed. This enables the control of the application of the reactant depending on the type of the print medium.

A second exemplary embodiment of the present disclosure will be described below. While the reactant application control for the thin line is described in the first exemplary embodiment, the reactant application to an isolation ink dot, other than the thin line, may also induce an ink flow and cause ink bleeding. In the second exemplary embodiment, a case where the reactant application control described in the first exemplary embodiment is expanded to control for an isolation ink dot will be described. A part similar to the first exemplary embodiment may be omitted.

When a color material ink dot is an isolated dot, if the reactant is applied to the same position as the position of the isolated dot or a position adjacent thereto, a color material ink flow occurs because of the contact between the color material ink dot and the reactant dot. If this phenomenon occurs at one point, this is less likely to be visually recognized. However, in a case where such minute bleeds occur in a scattered manner in a wide range, an image can appear to have degraded granularity.

Figure 11:
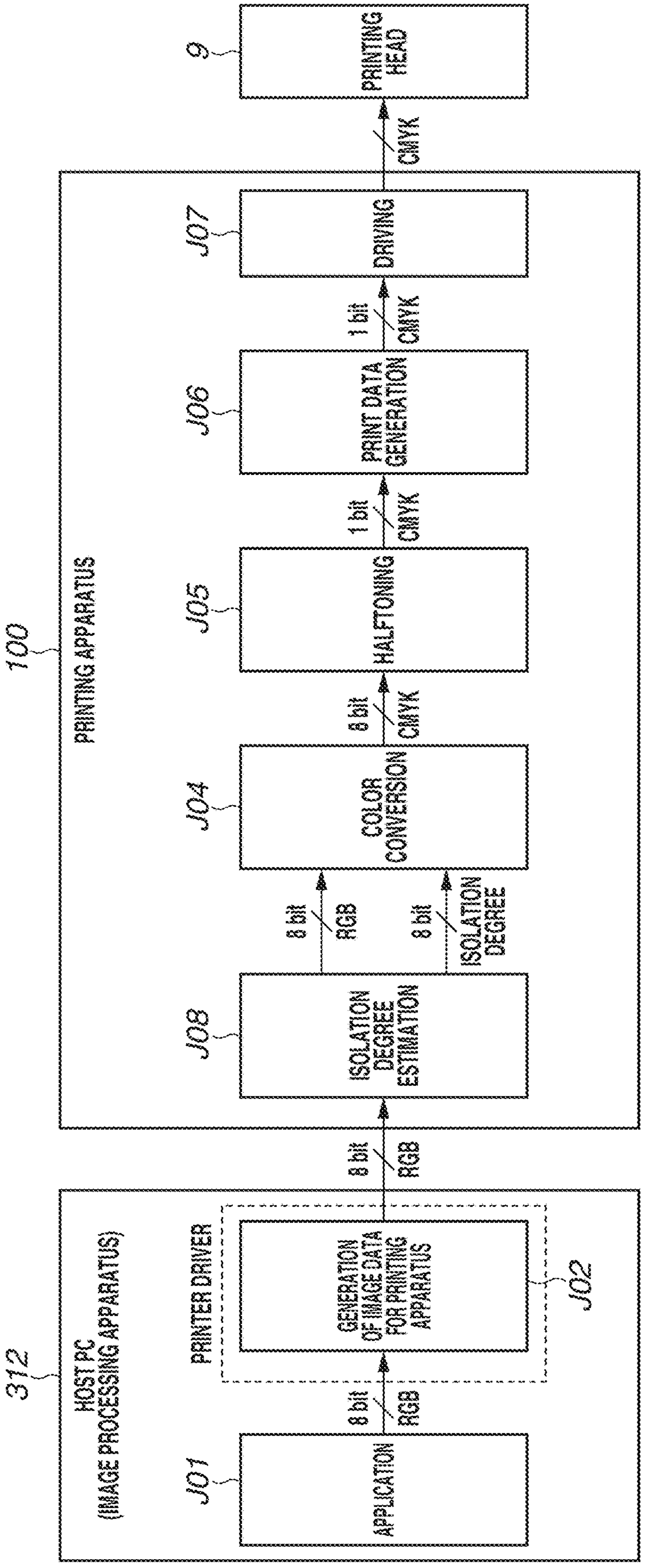
FIG. 11 is a diagram illustrating data processing stages in an exemplary embodiment.

In the first exemplary embodiment, the vector data for the CAD drawing has been described as an example. In the present exemplary embodiment, a form in which a granularity degradation greatly affects image quality, such as a picture or a poster, will be described as an example. FIG. 11 is a block diagram illustrating image processing according to the present exemplary embodiment. An input image is raster data (an RGB image) in this example.

(Estimation of Dot Isolation Degree)

An isolation degree estimation process J08 in FIG. 11 will be described. Processes J01, J02, and J04 to J07 are similar to the processes J01, J02, and J04 to J07 described in conjunction with FIG. 5, and thus descriptions thereof will be omitted here. Initially, the isolation degree estimation process J08 calculates an average density of a predetermined area. This can be directly used as an average dot number of a color material ink in the predetermined area. Here, the predetermined area is an area of 8×8 pixels.

Figure 12A:
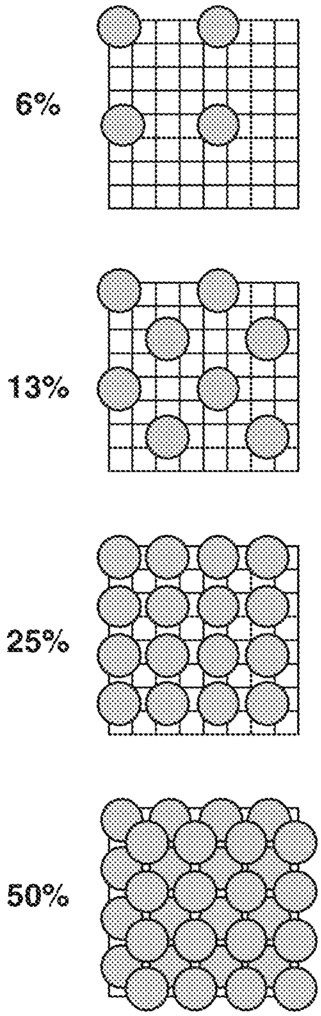
Figures 1, 12B:
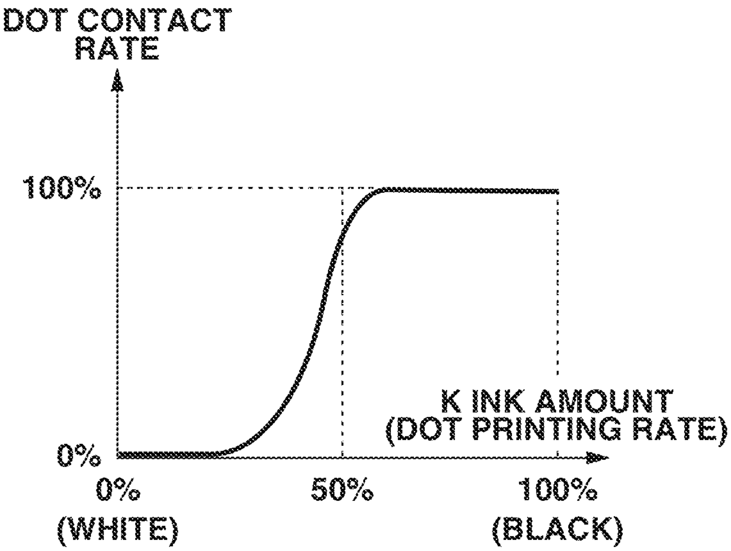
Figures 2, 12B:
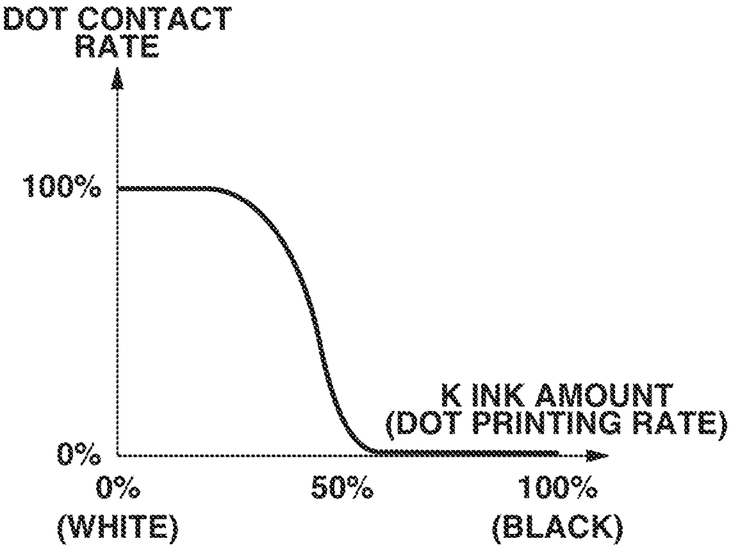

FIG. 12A illustrates the relationship between the size of a pixel in image processing and the dot diameter of a color material ink dot on a paper plane, and a state of the presence or absence of dot contact for each dot number of the color material ink. The resolution in the image processing is 1200 dpi, and the size of one pixel is about 21 μm. An ink drop to be ejected by one ejection is 4.5 pl, and the dot diameter of an ink dot on the paper plane is about 40 μm. Thus, as illustrated in FIG. 12A, in the case of the present exemplary embodiment, if the dot number of the color material ink in a predetermined region is about 25% or less, there is a possibility that the dots of the color material ink are not in contact with each other, i.e., all the dots of the color material ink are isolated dots. In contrast, if the density of an input image is 50% or more, the dots of the color material ink are likely to be in contact with each other in every direction, and almost no isolated ink dot is likely to exist. FIG. 12B-1 illustrates such a dot contact rate with respect to the density of the input image, as a graph. The probability of dot isolation is the reverse of the probability of contact, and this is illustrated in FIG. 12B-2 as a graph. The isolation degree estimation process J08 estimates that this probability of isolation is the dot isolation degree in the area.

Further, the isolation degree estimation process J08 determines that the target pixel is the isolated dot in a case where the isolation degree is higher than a predetermined threshold, and determines that the target pixel is not the isolated dot in a case where the isolation degree is equal to or lower than the predetermined threshold. Here, the predetermined threshold is 30%, and the isolation degree estimation process J08 determines that the target pixel is the isolated dot in a case where the isolation degree is higher than 30%.

(Control of Reactive Ink Based on Dot Isolation Degree)

Next, a method of controlling the reactive ink application amount based on the dot isolation degree will be described. The reactive ink application amount control is performed in the color conversion process J04 in FIG. 11.

Next, the reactant application amount can be corrected by a method similar to the method described in the first exemplary embodiment. In a case where a dot is not an isolated dot, the look-up table for normal pixel for applying the reactant in FIG. 8A is applied, and the color conversion process J04 is performed. The contact between the color material inks occurs frequently, so that a noticeable flow (bleed) of ink easily occurs. However, increasing of the viscosity of the color material ink by sufficiently applying the reactant enables the control of the generation of bleeds. In contrast, in a case where the dot is an isolated dot, the color conversion process J04 is applied using the look-up table for not applying the reactant in FIG. 8B. There is no contact between the color material inks, and there is no contact between the color material ink and the reactive ink, and thus the isolated dot does not flow and is heated by the heater 10 in a state where no bleed occurs. Therefore, it is possible to fix the ink on a print medium without breaking a dot arrangement.

As described above, according to the second exemplary embodiment, the dot isolation degree is estimated and the reactive ink is appropriately controlled based on a result of the estimation, so that it is possible to form an image without impairing the granularity of a low density region, while controlling bleeding regardless of the density of the image.

(Case of Line)

The above-described control for the isolated dot is also effective for a line portion.

In the case of the line portion, whether a line is independent from other objects is important. In the case of a black line on a white background, the ink is not applied to a portion around the black line, and thus the average density of a predetermined area is low, and the independence (the isolation degree) of the line is determined to be high. Thus, the control is performed using the look-up table in FIG. 8B to reduce the reactant application, so that bleeding by contact with the reactant is controlled.

In contrast, in the case of a black line on a color background, the color material ink is applied to the color background part, and thus the ink of an object which is not a line portion is applied around the black line. Thus, the average density of the predetermined area is high, and the independence (the isolation degree) of the line is determined to be low. Accordingly, the look-up table in FIG. 8A is used, and the reactant is sufficiently applied, so that bleeding between the line and the color background is controlled.

In a thick line, the solation degree is determined to be higher, gradually from the inside to the outside. Therefore, the reactant application amount is reduced as the reactant-applied portion is closer to the outside. In the ink inside the line, the viscosity is increased by the effect of the reactant, so that bleeding is controlled. For the ink on the edge of the thick line, the amount of the reactant to be applied is small, but the ink on the edge is pulled by the inside ink having the increased viscosity, so that the ink on the edge does not flow to a white portion outside the edge. Thus, it is possible to control bleeding of the entire thick line and to prevent a decline in image quality, by controlling bleeding through application of the reactant in sufficient amount to a central part of the thick line, while controlling bleeding by reducing the reactant application amount for an edge part of the thick line. Further, the reactant is not applied to an unnecessary part, thus reducing the consumption amount of the reactant.

(Case of Gradation)

In a case where a gradation image is used, a new issue may arise in the method of switching between application and non-application of the reactive ink based on whether the dot is the isolated dot as described above. If the reactant is suddenly applied in large amount in a certain gradation from a low density to a high density, the continuity of density and granularity can be damaged, which may result in a pseudo-contour.

Changing the reactant amount gradually based on the isolation degree eliminates strangeness without damaging the continuity. This can be implemented by multiplying reactant application amount data (RCT data) generated after the color conversion process using the look-up table, by a correction coefficient based on the dot isolation degree, in the color conversion process J04. Specifically, the correction can be performed using the following numerical formula:

RCT data (after correction)=RCT data (before correction)×(100%−Dot isolation degree).

When the dot isolation degree is 0% (when the ratio of contact between dots is 100%), RCT data (after correction)=RCT data (before correction), which results in that the reactant is sufficiently applied as illustrated in FIG. 8A, to the region.

In contrast, when the dot isolation degree is 100% (when the ratio of contact between dots is 0%), RCT data (after correction)=0, which results in that the reactant is not applied as illustrated in FIG. 8B, to the region.

When the dot isolation degree is 50%, RCT data (after correction)=RCT data (before correction)×(100%−50%)=RCT data (before correction)×0.5. In other words, half of the reactant application amount output based on the look-up table in FIG. 8A is applied.

Implementation is also possible by using the method of linearly interpolating the look-up tables described in the first exemplary embodiment, in place of the above-described method of performing multiplication by the correction coefficient.

(Character/Hatching)

Each of a hatching pattern and a character is a collection of thin lines, but can have an average density of about 50%. If the reactant is applied in such a case, a thin line is spread, and the image quality of hatching and character is impaired. Thus, there will be described a method of controlling the reactant by determining whether a target object is an object the shape of which is to be maintained independently from surroundings, such as a hatching pattern or a character, and estimating the isolation degree of the target pixel, in addition to the dot contact probability estimated from the average density.

Figure 13:
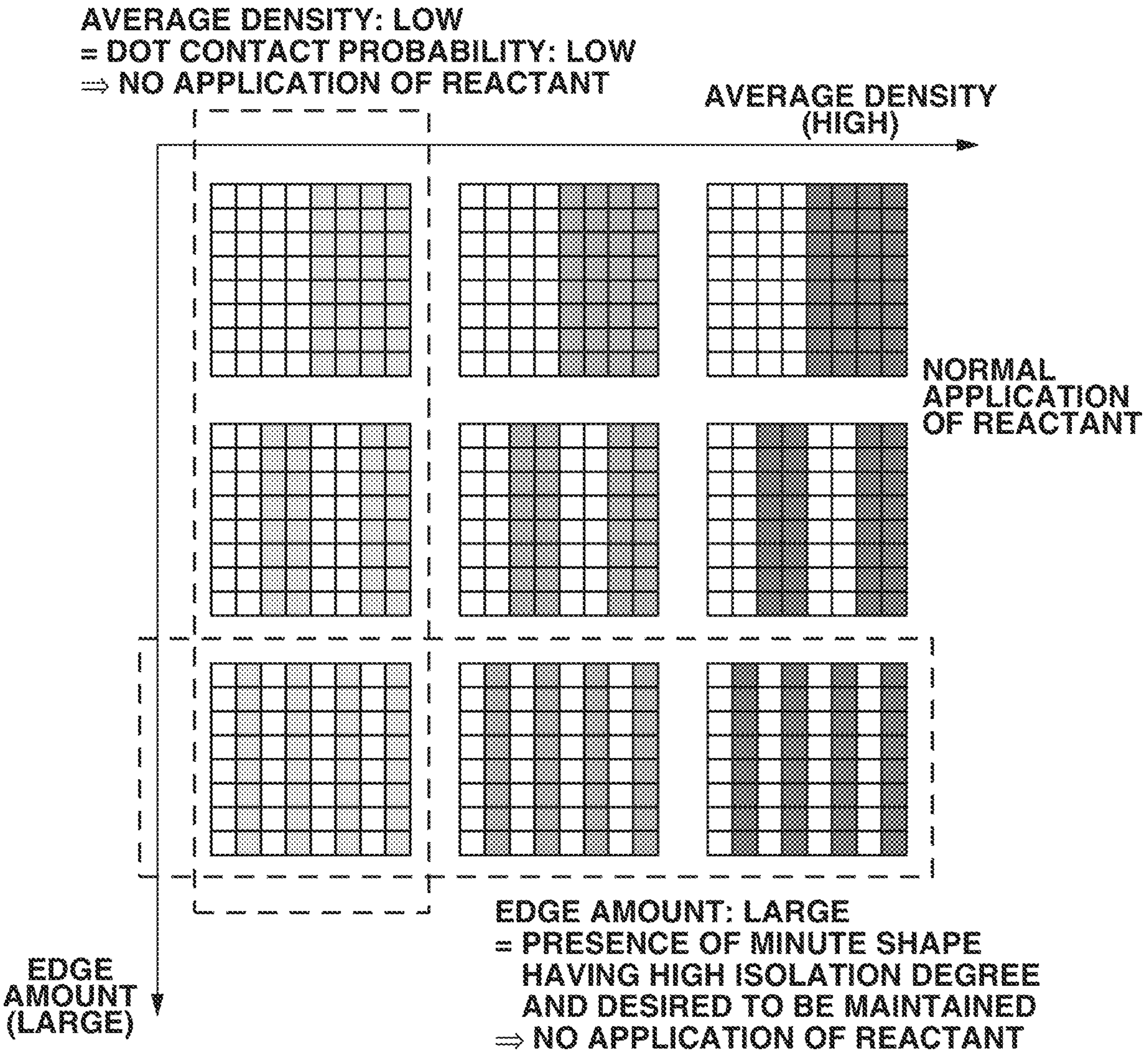
FIG. 13 is a diagram illustrating reactant application control based on a density and an edge amount of an image in an exemplary embodiment.

FIG. 13 illustrates an outline of this control.

Examples of such a method of determining whether the target object is an object the shape of which is to be maintained include a method of determining the presence or absence of a shape through edge extraction and a method of determining whether an image signal is noise by determining the directivity of an image using a directivity filter. More specifically, here, an edge of a predetermined area including the target pixel is extracted, and the total edge amount of the area is calculated. An area in which the total edge amount is larger than a specific amount is estimated to be a character or a hatching region. Such an area is determined to have a high degree of independence from surroundings.

The isolation degree is estimated based on the combination of the dot contact probability estimated from the average density and the degree of independence from the surroundings, and the reactant application amount is controlled based on the isolation degree, so that it is possible to form an image without impairing the details of a small character or hatching.

The accuracy can be further improved by using attribute information indicating a line attribute and a character attribute obtained from the drawing command in PDL described in the first exemplary embodiment, in combination with the above-described dot contact probability.

As described above, in the second exemplary embodiment, the dot or object isolation degree is estimated, and the application amount of the reactive ink is appropriately controlled based on a result of the estimation. This makes it possible to form a high-definition image, while controlling bleeding in a wide high-density region on a print medium, without impairing the granularity for a low-density region, and also maintaining high resolution for an exquisite object.

[Other Exemplary Embodiments]

The method of estimating a dot isolation degree from a multi-valued image and controlling the reactant amount based on the estimated dot isolation degree has been described above, but a method of determining a dot isolation degree based on dot data immediately before printing and controlling the reactant application amount based on the determined dot isolation degree may be used. The application amount of the reactant can be controlled by thinning out reactant dots, e.g., by thinning out reactant dots on an edge part of a line, or by determining an isolated dot of the color material ink and thinning out reactant dots from therearound, for binary dot data immediately before printing. In a state of being binary dot data indicating whether to apply the ink, the dot data is directly corrected, so that more precise correction can be performed dot by dot.

More specifically, initially, whether a dot is an isolated dot is determined based on the number of adjacent dots. This is possible by counting the total dot number of a 3×3 area around a target pixel. If the total dot number is only one which is the target pixel, the dot can be determined as an isolated dot. At this moment, if printing using only K is performed, only the numbers of K dots are summed up, and if four-color printing using CMYK is performed, the dot numbers of each of CMYK are summed up.

If the dot number is two or more, the probability of contact between the dots increases. As described in conjunction with FIGS. 12A to 12B-2 in the second exemplary embodiment, the contact rate (the degree of being a non-isolated dot) can be calculated for the number of printing dots. The reciprocal number of the contact rate is the dot isolation degree. If the determination is performed using the dot data, the isolated dot can be determined more accurately.

In this way, the reactant application amount can be controlled based on the calculated isolation degree. The application amount of the reactant can be controlled by a method of thinning out reactant dots by performing mask processing using a mask pattern corresponding to the isolation degree, pixel by pixel, for reactant dot data.

It is difficult to determine a line in a binary image, but binary dot data images are added together in a predetermined area, and easily restored to a multi-valued image (binary multiple value conversion). Then, whether or not a target is a line is determined using the line determination method described in the first exemplary embodiment, so that the whether or not the target is a line can be determined in the dot data as well. For a line pixel, all the reactant dots are removed, and, for a non-line portion, the mask processing is performed using the mask pattern corresponding to the isolation degree, and the reactant dots are thinned out. The mask pattern to be used is thus changed depending on the line portion or the non-line portion, so that the reactant in appropriate amount can be applied to each of the line portion and the non-line portion.

(Changing Correction Intensity for Each Color)

It is possible to adopt a configuration in which correction intensity is increased for an important color of an image. For example, a black line is particularly important in a CAD drawing. For example, the following control is possible. First, pure black of RGB (0, 0, 0) is determined in an RGB image from an input image, and a line of only black is identified. Subsequently, if the line is a pure black line, all the reactant dots are removed.

The amount of ink can be large for a line of a color other than black or a secondary color, compared with a line of a black single color. For such a line, the application amount of the color material ink to the line itself is large, and the ink overflows without the reactant, resulting in bleeding. In contrast, as described above, the correction intensity is made variable for each color, the reactant is thinned out for only the line of the black single color, and the reactant is applied to the line of other color in a manner similar to the non-line portion. By providing such a configuration, either line can have the optimum quality.

(Changing Correction Intensity for Each Medium)

Depending on the print medium, the interfacial tension with respect to an ink drop varies, and the wet spreading manner of a droplet also varies. It is effective to change the way of thinning out the reactant dots for individual print mediums.

As described above, by using the method described in the present exemplary embodiment, it is possible to form a high-definition image, while controlling bleeding in a wide high-density region on a print medium, without impairing the granularity for a low-density region, and also maintaining high resolution for an exquisite object.

In the above-described exemplary embodiment, an image is printed on a print medium by the inkjet method of ejecting ink from the ejection port, but other types of printing apparatus can be used if this apparatus has a configuration in which a reactant application amount for a print medium can be changed. In any types of apparatus, there can be a deviation between the timing for applying a reactive ink and the timing for applying an ink including a color material from a unit that applies the inks to a print medium, and thus a landing position deviation may occur. By applying the present disclosure to such an apparatus, bleeding can be controlled, so that a decline in image quality can be prevented.

The present disclosure can also be implemented by processing for supplying a program for implementing one or more functions in the above-described exemplary embodiments to a system or apparatus via a network or a storage medium and causing one or more processors in a computer of the system or apparatus to read and execute the program. The present disclosure can also be implemented by a circuit that implements the one or more functions (for example, an application specific integrated circuit (ASIC)).

According to the present exemplary embodiments, a decline in the image quality of a line portion can be prevented.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-117911, filed Jul. 16, 2021, which is hereby incorporated by reference herein in its entirety.

What is claimed is:

1. A printing apparatus comprising:

an ink application unit configured to apply an ink including a color material to a print medium;

a reactant application unit configured to apply, to the print medium, a reactant for promoting solidification of the ink by reaction with the ink;

a control unit configured to control an application amount of the reactant to be applied by the reactant application unit; and an identification unit configured to identify a pixel included in a line portion based on image data indicating an image to be formed on the print medium, wherein the printing apparatus forms the image by applying the ink from the ink application unit in accordance with the image data, and wherein the control unit controls the application amount of the reactant so that an amount per unit area of the reactant to be applied to a region in which the line portion to be formed on the print medium with the pixel identified by the identification unit as included in the line portion is to be printed is less than the amount per unit area of the reactant to be applied to a region in which an image including a pixel not identified by the identification unit as included in the line portion is formed.

2. The printing apparatus according to claim 1, further comprising a width determination unit configured to determine a width of the line portion including the pixel identified as the line portion by the identification unit, wherein, in a case where the width of the line portion to be formed on the print medium with the pixel identified by the identification unit is determined by the width determination unit to be a predetermined width or less, the control unit controls the application amount of the reactant so that the amount per unit area of the reactant to be applied to a region identified as the line portion is less than the amount per unit area of the reactant to be applied to a region in which an image including a pixel not identified as the line portion by the identification unit is to be formed.

3. The printing apparatus according to claim 2, wherein the control unit controls the application amount of the reactant so that the amount per unit area of the reactant to be applied to a region corresponding to the line portion the width of which has been determined to be the predetermined width or less, in a case where the width determined by the width determination unit is the predetermined width or less, is less than the amount per unit area of the reactant to be applied to a region corresponding to a line portion the width of which has been determined to be not the predetermined width or less, in a case where the width determined by the width determination unit is the predetermined width or less.

4. The printing apparatus according to claim 2, wherein a value which is different depending on a type of a print medium is set to the predetermined width.

5. The printing apparatus according to claim 2, wherein the control unit controls the application amount of the reactant so that the amount per unit area of the reactant to be applied to a line portion having a first width in a case where the width determined by the width determination unit is the first width equal to or less than the predetermined width, is greater than the amount per unit area of the reactant to be applied to a line portion having a second width in a case where the width determined by the width determination unit is the second width smaller than the first width.

6. The printing apparatus according to claim 1, wherein the control unit controls the application amount of the reactant so as not to apply the reactant to the line portion to be formed on the print medium with the pixel identified by the identification unit.

7. The printing apparatus according to claim 1, wherein the identification unit is configured to identify a pixel included in a line portion through a filtering process.

8. The printing apparatus according to claim 1, further comprising a conversion processing unit configured to perform conversion processing of converting data corresponding to a color space of the image into data corresponding to a color space supported by the printing apparatus using a look-up table, wherein the conversion processing unit switches to a look-up table to be used in the conversion processing, depending on whether a pixel to be subjected to the conversion processing is the pixel identified as the line portion by the identification unit.

9. The printing apparatus according to claim 1, wherein the ink application unit is configured to apply a plurality of inks of different colors, wherein the printing apparatus further comprises a color determination unit configured to determine color of a line portion in a case where a pixel of the line portion is the pixel identified as the line portion by the identification unit, and wherein the control unit controls the application amount of the reactant, based on the color of the line portion determined by the color determination unit in the case where the pixel of the line portion is the pixel identified as the line portion by the identification unit.

10. The printing apparatus according to claim 9, wherein the ink application unit is configured to apply a plurality of inks including an ink of a black color, and an ink of a color other than the black color, and wherein the control unit controls the application amount of the reactant so that the amount per unit area of the reactant to be applied to a line portion including a pixel that is identified as the line portion by the identification unit and for which it is determined that the color of the line portion is a color to be subjected to printing using only the ink of the black color, is less than an amount per unit area of the reactant to be applied to a line portion including a pixel that is identified as the line portion by the identification unit and for which it is determined that the color of the line portion is a color to be subjected to printing using the ink of the color other than the black color.

11. The printing apparatus according to claim 1, wherein the print medium is a low-permeability print medium which absorbs no water.

12. The printing apparatus according to claim 1, further comprising:

a carriage carrying the ink application unit and the reactant application unit:

a moving unit configured to move the carriage in a first direction;

a conveyance unit configured to convey the print medium in a direction intersecting the first direction, wherein an image is formed on the print medium, by applying the ink and the reactant to the print medium from the ink application unit and the reactant application unit, while the carriage is being moved by the moving unit.

13. The printing apparatus according to claim 1, wherein the ink application unit has an ejection port for ejecting the ink, and wherein the reactant application unit has an ejection port for ejecting the reactant.

14. A printing apparatus comprising:

an ink application unit configured to apply an ink including a color material to a print medium;

a reactant application unit configured to apply a reactant for promoting solidification of the ink by reaction with the ink to the print medium;

a control unit configured to control an application amount of the reactant to be applied by the reactant application unit; and a determination unit configured to determine an isolation degree of a dot to be printed in a predetermined region on the print medium, based on image data indicating an image to be formed on the print medium, wherein the control unit controls the application amount of the reactant so that an amount per unit area of the reactant to be applied to the predetermined region in a case where the isolation degree of the predetermined region determined by the determination unit is higher than a predetermined degree, is less than that in a case where the isolation degree is the predetermined degree or lower.

15. The printing apparatus according to claim 14, wherein a size of the predetermined region is different depending on a type of the print medium.

16. The printing apparatus according to claim 14, wherein the determination unit determines the isolation degree based on a value of at least one of an average density of the predetermined region, an edge amount of the predetermined region, and attribute information indicating that a pixel of the predetermined region is a line or a character.

17. The printing apparatus according to claim 14, wherein, in a case where a line portion having a predetermined width or more is to be printed, the control unit controls the application amount of the reactant so that the amount per unit area of the reactant to be applied to an edge part of the line portion is less than an amount per unit area of the reactant to be applied to a central part of the line portion.

18. The printing apparatus according to claim 14, further comprising a conversion processing unit configured to perform conversion processing of data corresponding to a color space of an image into data corresponding to a color space supported by the printing apparatus using a look-up table, wherein the conversion processing unit switches to a look-up table to be used in the conversion processing, depending on whether the isolation degree determined by the determination unit for the predetermined region is a predetermined value or more.

19. The printing apparatus according to claim 14, further comprising a processing unit configured to perform mask processing of masking binary image data indicating whether to apply ink using a mask pattern and determining a position of ink to be applied to a print medium, wherein the processing unit changes the mask pattern to be used in the mask processing, based on the isolation degree determined by the determination unit.

20. A printing method comprising:

forming an image, using an ink application unit configured to apply an ink including a color material to a print medium and a reactant application unit configured to apply a reactant for promoting solidification of the ink by reaction with the ink to the print medium, by applying the ink and the reactant to the print medium, in accordance with image data;

identifying a pixel included in a line portion based on the image data indicating the image to be formed on the print medium; and performing control so that an amount per unit area of the reactant to be applied to a region to be subjected to printing the line portion to be formed on the print medium using the pixel identified as included in the line portion is less than the amount per unit area of the reactant to be applied to a region in which an image including a pixel not identified as included in the line portion is to be formed.

21. A printing method comprising:

forming an image, using an ink application unit configured to apply an ink including a color material to a print medium and a reactant application unit configured to apply a reactant for promoting solidification of the ink by reaction with the ink to the print medium, by applying the ink and the reactant to the print medium, in accordance with image data;

determining an isolation degree of a dot to be printed in a predetermined region on the print medium, based on the image data indicating the image to be formed on the print medium; and performing control so that an amount per unit area of the reactant to be applied to the predetermined region in a case where the determined isolation degree of the predetermined region is higher than a predetermined degree, is less than that in a case where the isolation degree is the predetermined degree or lower.

* * * * *